United States Patent
Iwamoto et al.

(10) Patent No.: US 11,927,453 B2
(45) Date of Patent: Mar. 12, 2024

(54) ROUTE DETERMINATION SYSTEM, ROUTE DETERMINATION METHOD, AND ROUTE DETERMINATION PROGRAM

(71) Applicant: Toyota Jidosha Kabushiki Kaisha, Toyota (JP)

(72) Inventors: Kunihiro Iwamoto, Nagakute (JP); Yuta Itozawa, Nagoya (JP); Hirotaka Komura, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 17/410,315

(22) Filed: Aug. 24, 2021

(65) Prior Publication Data

US 2022/0065640 A1 Mar. 3, 2022

(30) Foreign Application Priority Data

Aug. 26, 2020 (JP) ................................ 2020-142461

(51) Int. Cl.
*G01C 21/34* (2006.01)
*G01C 21/36* (2006.01)
*G06Q 40/03* (2023.01)

(52) U.S. Cl.
CPC ..... *G01C 21/3461* (2013.01); *G01C 21/3415* (2013.01); *G01C 21/3617* (2013.01); *G06Q 40/03* (2023.01)

(58) Field of Classification Search
CPC ............ G01C 21/3461; G01C 21/3415; G01C 21/3617; G06Q 40/03; G06Q 10/047; G06Q 10/083; G06Q 50/28; G06Q 10/08355
See application file for complete search history.

(56) References Cited

U.S. PATENT DOCUMENTS

| | | | |
|---|---|---|---|
| 11,037,247 B2 * | 6/2021 | Bogovich | G08G 1/096827 |
| 2012/0150430 A1 * | 6/2012 | French | G01C 21/3453 |
| | | | 701/425 |

FOREIGN PATENT DOCUMENTS

JP 2002-096913 A 4/2002

* cited by examiner

*Primary Examiner* — Anne Marie Antonucci
*Assistant Examiner* — Jewel Ashley Kuntz
(74) *Attorney, Agent, or Firm* — Dinsmore & Shohl LLP (57) ABSTRACT

A risk of theft is reduced in transportation by an autonomous mobile body. A route determination system according to the present disclosure determines a transport route of an article to be transported by an autonomous mobile body. The route determination system according to the present disclosure includes a judgement unit that judges whether or not an area including a position of a person is dangerous based on position information of the person and a credit rank of the person and a route determination unit that determines, as the transport route, a bypass route for bypassing a dangerous area when a candidate of the transport route passes through the dangerous area judged to be dangerous by the judgement unit.

7 Claims, 8 Drawing Sheets

ROUTE DETERMINATION SYSTEM, ROUTE DETERMINATION METHOD, AND ROUTE DETERMINATION PROGRAM

CROSS REFERENCE TO RELATED APPLICATIONS

This application is based upon and claims the benefit of priority from Japanese patent application No. 2020-142461, filed on Aug. 26, 2020, the disclosure of which is incorporated herein in its entirety by reference.

BACKGROUND

The present disclosure relates to a route determination system, a route determination method, and a route determination program.

Japanese Unexamined Patent Application Publication No. 2002-96913 discloses a technique in which a measurement value and position information of a sensor are recorded on an electronic tag of a delivery article, and the recorded data is used to improve the delivery service. According to the technique disclosed in Japanese Unexamined Patent Application Publication No. 2002-96913, it is possible to select a route with fewer vibrations using the history in which the position information of a vehicle is associated with vibration data.

SUMMARY

In this case, there is a problem that the risk of theft is high when a package is delivered using an autonomous mobile body. In particular, when the size of the autonomous mobile body is small, not only the package but also the autonomous mobile body itself has a risk of theft.

The present disclosure achieves a method for determining a transport route of an autonomous mobile body capable of determining a transport route with little risk of theft.

A route determination system according to the present disclosure is for determining a transport route for an autonomous mobile body to transport an article on. The route determination system includes: a judgement unit configured to judge whether or not an area including a position of a person is dangerous based on position information of the person and a credit rank of the person; and a route determination unit configured to determine, as the transport route, a bypass route for bypassing a dangerous area when a candidate of the transport route passes through the dangerous area judged to be dangerous by the judgement unit.

A route determination method according to the present disclosure is for determining a transport route for an autonomous mobile body to transport an article on. The route determination method includes: judging whether or not an area including a position of a person is dangerous based on position information of the person and a credit rank of the person; and determining, as the transport route, a bypass route for bypassing a dangerous area when a candidate of the transport route passes through the dangerous area judged to be dangerous in the determining of whether or not the area including the position of the person is dangerous.

A route determination program according to the present disclosure is for determining a transport route for an autonomous mobile body to transport an article on. The route determination program causes a computer to execute: judging whether or not an area including a position of a person is dangerous based on position information of the person and a credit rank of the person; and determining, as the transport route, a bypass route for bypassing a dangerous area when a candidate of the transport route passes through the dangerous area judged to be dangerous in the determining of whether or not the area including the position of the person is dangerous.

According to the present disclosure, it is possible to reduce a risk of theft in transporting by an autonomous mobile body.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
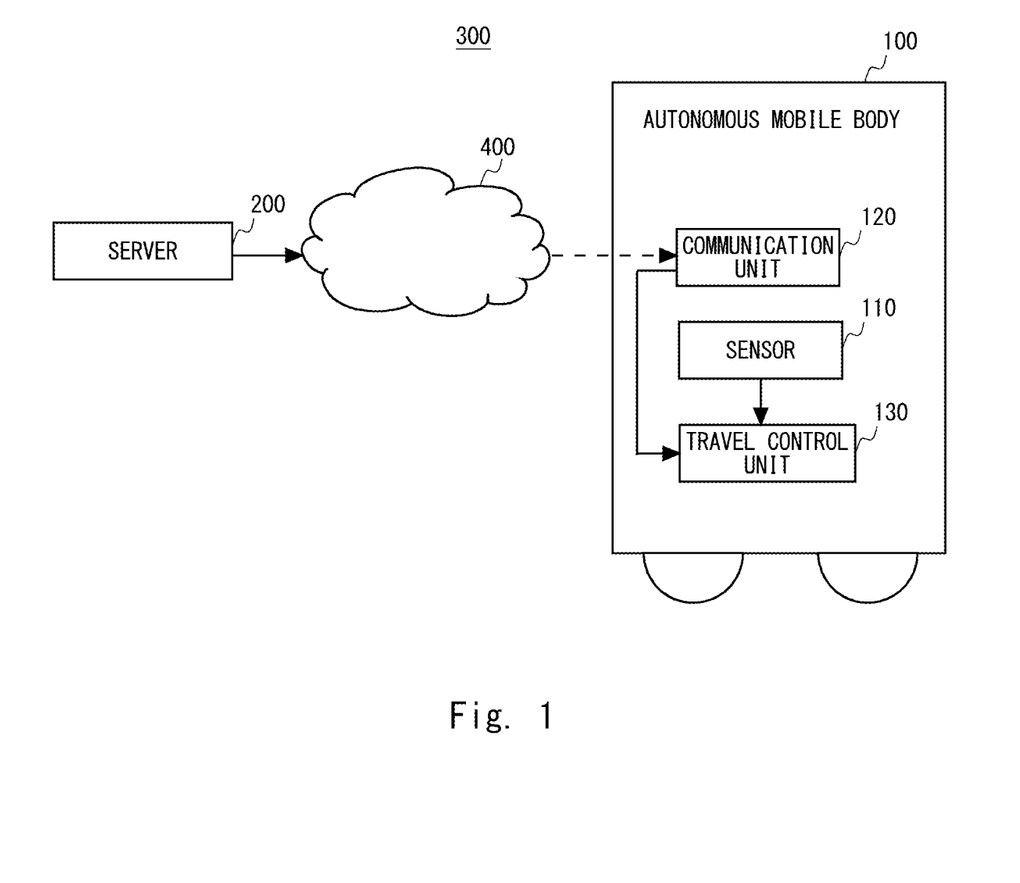
FIG. 1 is a configuration diagram showing a configuration example of a route determination system according to a first embodiment.

Embodiments of the present disclosure will be described below with reference to the drawings. FIG. 1 is a configuration diagram showing a configuration example of a route determination system 300 according to a first embodiment. The route determination system 300 includes a server 200 and an autonomous mobile body 100.

The autonomous mobile body 100 may be an automatic drive vehicle traveling on a roadway or a smaller delivery robot traveling on a sidewalk. The autonomous mobile body 100 autonomously moves along a predetermined transport route to deliver a package. The autonomous mobile body 100 and the server 200 are connected to each other via a network 400. The network 400 is a communication line network such as the Internet, an intranet, a cellular phone network, and a LAN (Local Area Network).

The route determination system 300 may include a plurality of the autonomous mobile bodies 100. Hereinafter, although the case in which the transport route is determined on the server 200 side will be described, the transport route may be determined on the autonomous mobile body 100 side.

The autonomous mobile body 100 includes a sensor 110, a communication unit 120, and a travel control unit 130. The sensor 110 collects environmental data around the autonomous mobile body 100 and outputs it to the travel control unit 130. The sensor 110 is, for example, a camera, radar, LIDAR, or the like. The communication unit 120 is a communication interface for performing wireless communication with the network 400. The communication unit 120 receives the transport route determined by the server 200 via the network 400. The communication unit 120 may transmit position information indicating a position of the autonomous mobile body 100 to the server 200.

The travel control unit 130 controls the autonomous mobile body 100 to autonomously move along the transport route using the environmental data collected by the sensor 110. Here, it is assumed that the autonomous mobile body 100 acquires the position of the autonomous mobile body 100 by GPS (Global Positioning System), the sensor 110, or the like. As described above, the transport route may be determined not on the server 200 side but on the autonomous mobile body 100 side.

Figure 2:
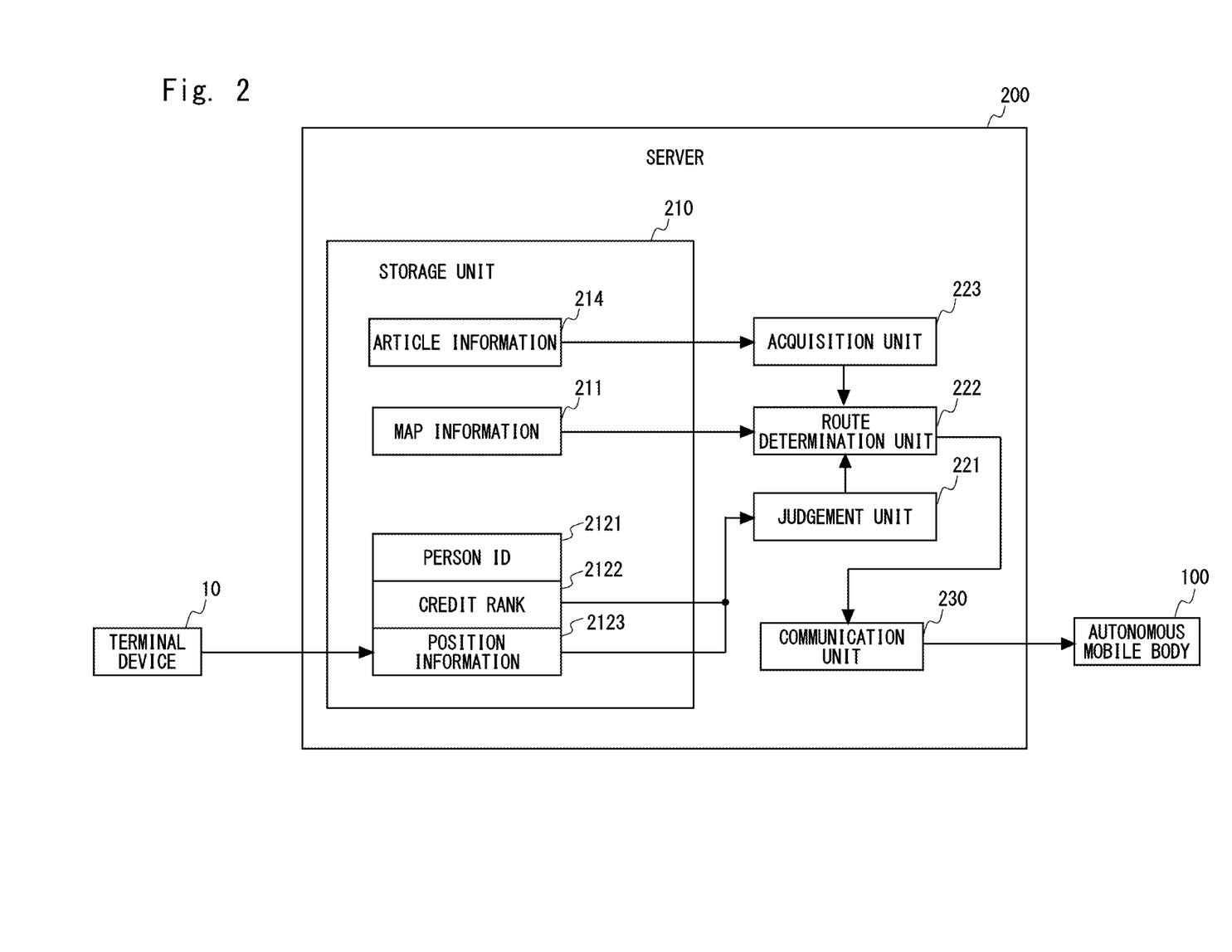
FIG. 2 is a block diagram showing a functional configuration of a server according to the first embodiment.

Next, the server 200 will be described in detail with reference to FIG. 2. The server 200 determines the transport route for the autonomous mobile body 100 to transport the package. The server 200 includes a storage unit 210, a judgement unit 221, a route determination unit 222, an acquisition unit 223, and a communication unit 230. The storage unit 210 is a storage apparatus such as a hard disk or a flash memory. The storage unit 210 may also include a volatile storage apparatus such as a RAM (Random Access Memory) which is a storage area for temporarily holding information. The communication unit 230 is a communication interface with the network 400.

The storage unit 210 stores article information 214, map information 211, a person ID 2121, a credit rank 2122, and position information 2123. The article information 214 is information representing a starting point and a destination point in transporting an article. As the starting point, a current position of the autonomous mobile body 100 received from the autonomous mobile body 100 may be used. The article information 214 may also include information indicating whether or not the article to be transported is a valuable article.

The map information 211 is map data including a delivery area, and is used when the route determination unit 222 to be described later determines the transport route. The map information 211 may be, for example, data of a road map in which nodes representing intersections and links representing passages are numbered. The map information 211 may be an environmental map showing an area of a building as an obstacle or the like.

The storage unit 210 stores the person ID 2121, the credit rank 2122, and the position information 2123 in association with each other. The person ID 2121 is an identifier for identifying a person for whom the credit rank 2122 described later is set. The person ID 2121 may be, for example, a public identifier such as My Number, or may be a user ID given by a service provider providing a predetermined service.

The credit rank 2122 is an evaluation value indicating the social creditworthiness of the person. The credit rank 2122 is calculated, for example, based on the person's past crime history, delinquency history of the financial institution, income, etc. The credit rank may be calculated, for example, between 0 and 100. When the autonomous mobile body 100 travels close to a person whose credit rank 2122 is below a threshold, the risk of theft is considered high.

The position information 2123 indicates the position of the person for whom the credit rank 2122 is set. The position information 2123 is determined based on position information such as GPS information received from a terminal device 10. The terminal device 10 is, for example, a mobile phone, a smartphone, or the like. The position information 2123 may be information related to an area where the person is present. Here, the server 200 may receive the position information 2123 from the terminal device 10, and the autonomous mobile body 100 may receive the position information 2123 from the terminal device 10. The position information 2123 may be a predetermined location such as an address.

The position information 2123 may be determined based on the position of a monitoring camera installed on the street. For example, it is assumed that the storage unit 210 stores the person ID 2121 and face feature information in association with each other. The server 200 performs face authentication on a photographed image acquired from the monitoring camera using the stored face feature information, so that the position information 2123 of the person whose face authentication is successful can be determined as the position of the monitoring camera.

The judgement unit 221 judges whether or not an area including the position of the person is dangerous based on the position information 2123 and the credit rank 2122. For example, the judgement unit 221 may judge whether or not an area in a predetermined range including a low credit person whose credit rank is a predetermined value or less is dangerous. A threshold used in the judgement need not be constant. For example, when there are many low credit persons, the judgement unit 221 can appropriately judge whether or not the area is dangerous by changing the threshold.

The acquisition unit 223 acquires the article information 214 from the storage unit 210 and outputs it to the route determination unit 222. The acquisition unit 223 may acquire information representing the starting point from the autonomous mobile body 100 via the communication unit 230.

The route determination unit 222 determines the transport route using the map information 211 and outputs it to the communication unit 230. The route determination unit 222 specifies a candidate of the transport route using a known algorithm. When the candidate of the transport route passes through a dangerous area judged to be dangerous by the judgement unit 221, the route determination unit 222 determines a bypass route that bypasses the dangerous area as the transport route using the map information 211.

Alternatively, when the article to be transported is not expensive, the route determination unit 222 may determine the candidate of the transport route as the transport route, whereas when the article to be transported is expensive, the route determination unit 222 may determine the transport route not to pass through the dangerous area. Further alternatively, the judgement unit 221 may acquire the price or the like of the article to be transported from the acquisition unit 223, and judge whether or not the area is dangerous based on the price or the like. For example, the judgement unit 221 may set the threshold used for the judgement in such a way that the threshold becomes lower as the price increases, so that the number of dangerous areas increases. The functions of the judgement unit 221, the route determination unit 222, and the acquisition unit 223 may be implemented by a processor (not shown) reading a program into a RAM and executing the program.

Figure 3:
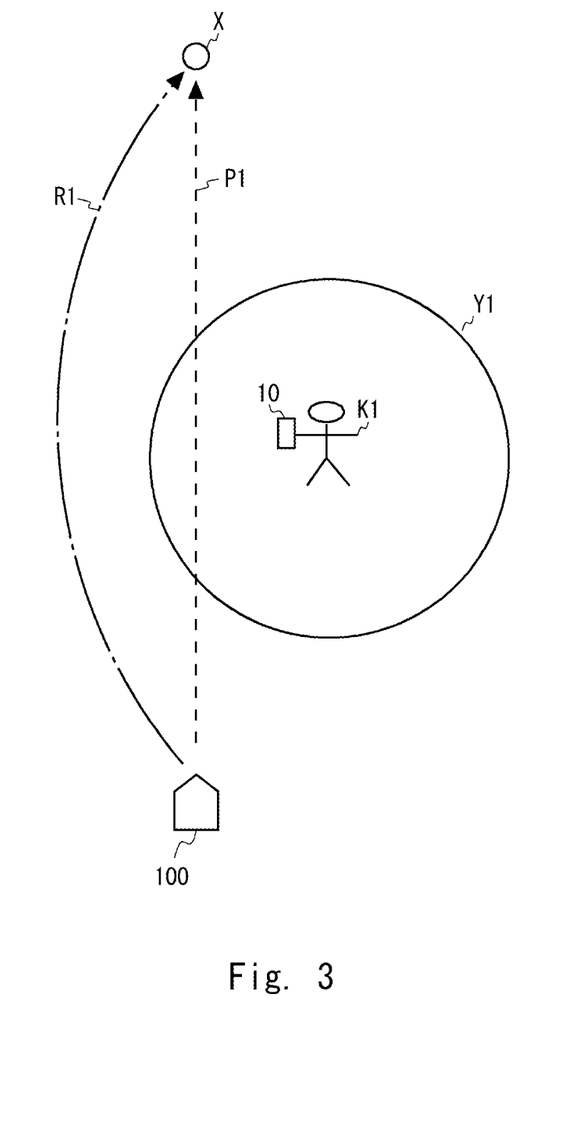
FIG. 3 is a schematic diagram showing an example of a transport route determined by the route determination system according to the first embodiment.

FIG. 3 is a schematic diagram showing an example of the transport route to be determined. The position of the autonomous mobile body 100 is set as the starting point, and a delivery destination X is set as a destination point. It is assumed that a low credit person K1 is present around the delivery area. It is assumed that the server 200 or the autonomous mobile body 100 receives the position information 2123 of the low credit person K1 from the terminal device 10. In such a case, the judgement unit 221 judges, for example, that an area Y1 around the low credit person K1 is dangerous. Here, a candidate P1 of the transport route as the shortest path passes through the area Y1. Therefore, the route determination unit 222 determines the bypass route R1 as the transport route. Since the route R1 does not pass around the low credit person K1, it is considered that the risk of theft is lower than that in the case of the candidate P1.

Figure 4:
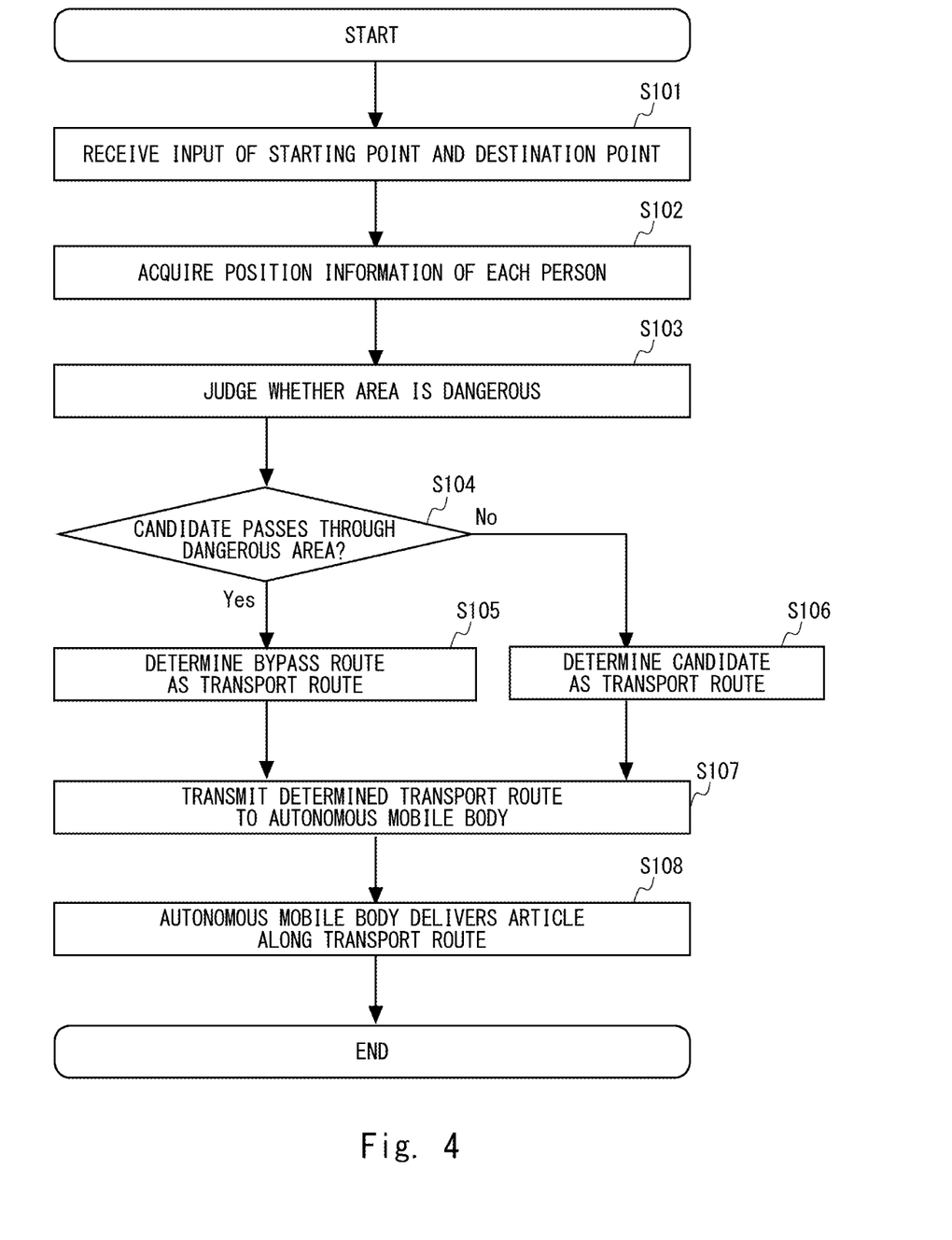
FIG. 4 is a flowchart showing an operation example of the route determination system according to the first embodiment.

FIG. 4 is a flowchart showing an operation of the route determination system 300 according to the first embodiment. It is assumed that the server 200 stores the person ID 2121 and the credit rank 2122 in association with each other. First, the route determination system 300 acquires information related to the starting point and the destination point (Step S101). The starting point may be the current position of the autonomous mobile body 100 or a warehouse for storing delivery articles. The destination point is information indicating the delivery destination of the article.

Next, the route determination system 300 receives the position information 2123 from the terminal device 10 of the person for whom the credit rank 2122 is set (Step S102). The route determination system 300 may use information such as an address registered in advance as the position information 2123 of each person. Next, the judgement unit 221 judges whether or not the area including the position of the person is dangerous based on the position information 2123 and the credit rank 2122 (Step S103). Next, the route determination unit 222 judges whether or not the candidate of the transport route passes through the dangerous area judged to be dangerous in Step S103 (Step S104). If the candidate of the transport route passes through the dangerous area (Yes in Step S104), the route determination unit 222 determines the bypass route that bypasses the dangerous area as the transport route (Step S105). If the candidate of the transport route does not pass through the dangerous area (No in Step S104), the route determination unit 222 determines the candidate of the transport route as the transport route (Step S106).

Next, the server 200 transmits the determined transport route to the autonomous mobile body 100 (Step S107). When the autonomous mobile body 100 determines the transport route, the processing of Step S107 is not necessary. Finally, the autonomous mobile body 100 autonomously moves along the transport route acquired in Step S107, and delivers the article to the destination point (Step S108).

The route determination system 300 determines the transport route based on the position information 2123 of the person for whom the credit rank 2122 is set. In this way, the route determination system 300 can reduce the risk of theft by a person whose credit rank 2122 is lower than that in the case of another person.

Although the case in which the server 200 determines the transport route has been described, the autonomous mobile body 100 may acquire the information of the delivery destination and determine the transport route from the current position to the delivery destination. That is, the processing performed by the judgement unit 221 and the route determination unit 222 may be performed on the autonomous mobile body 100 side.

The autonomous mobile body 100 autonomously moves along the transport route determined by the autonomous mobile body 100 itself to deliver articles. In such a case, the route determination system 300 may not include the server 200. That is, a system in which the processing is completed within the autonomous mobile body 100 can also be included in the route determination system 300 according to the first embodiment.

Second Embodiment

Figure 5:
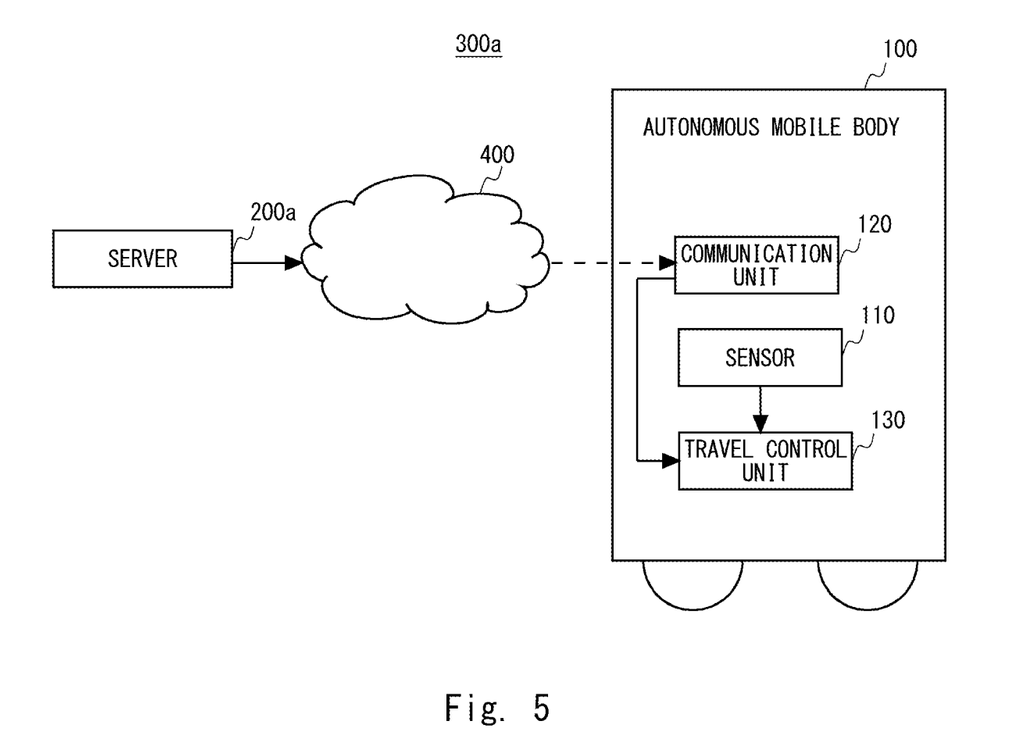
FIG. 5 is a configuration diagram showing a configuration example of a route determination system according to a second embodiment.

A route determination system 300a according to a second embodiment uses the credit rank 2122 and the position information 2123 to judge whether or not an area in a predetermined range is dangerous. FIG. 5 is a configuration diagram showing a configuration example of the route determination system 300a. The route determination system 300a includes a server 200a and the autonomous mobile body 100. Since the system configuration of the route determination system 300a is the same as that shown in FIG. 1, description thereof will be omitted.

Figure 6:
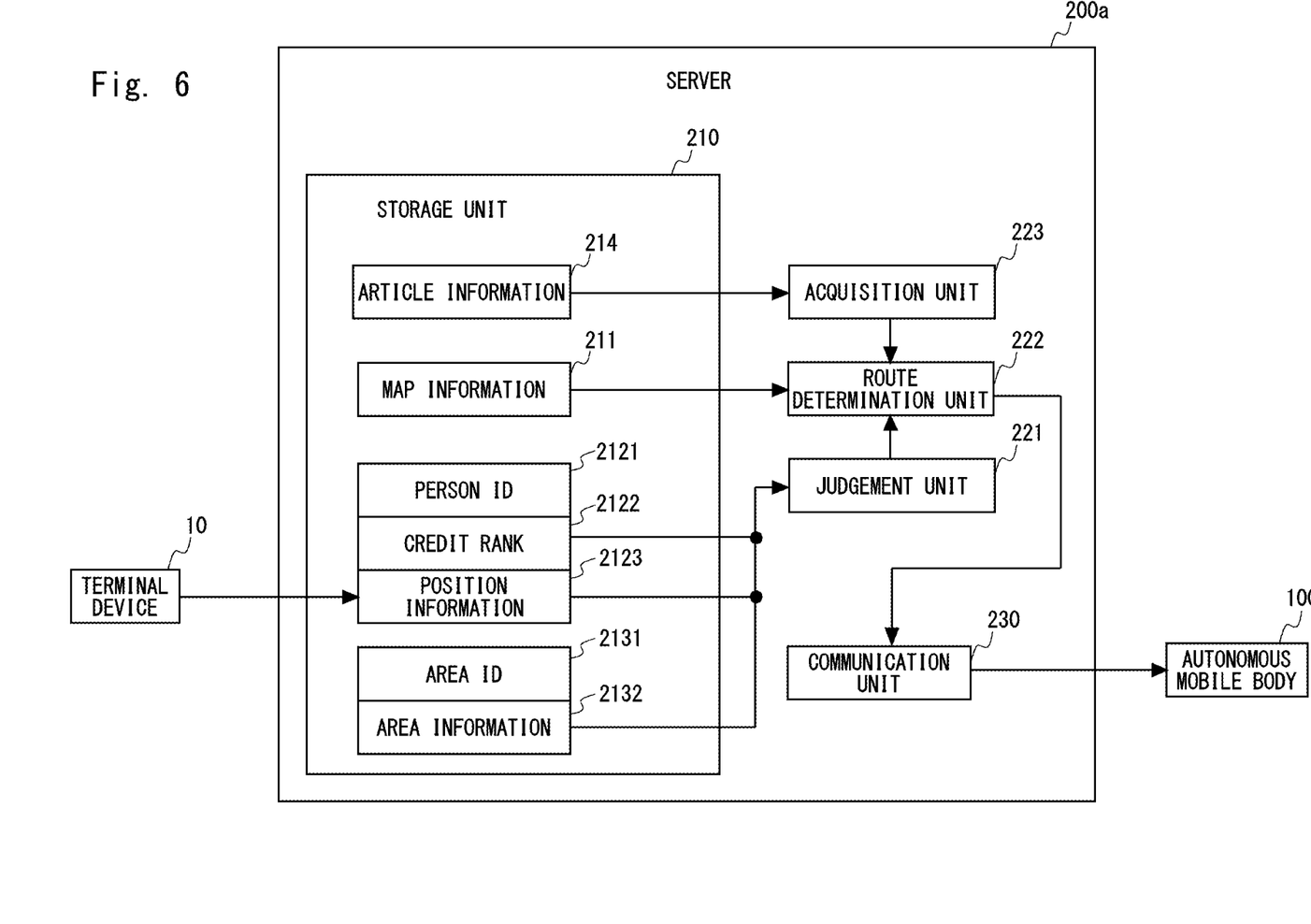
FIG. 6 is a block diagram showing a functional configuration of a server according to the second embodiment.

Next, the server 200a will be described with reference to FIG. 6. This embodiment differs from the first embodiment in that, in this embodiment, an area ID 2131 and area information 2132 are stored in the storage unit 210. The area is a divided delivery area where the autonomous mobile body 100 performs delivery. A municipality or a block may be used as the area. Alternatively, each region obtained by dividing the delivery area into predetermined sizes may be used as the area. The area ID 2131 is an identifier for identifying each area. The area information 2132 is information related to a range of each area.

The judgement unit 221 identifies a person positioned inside each area based on the area information 2132 and the position information 2123. The judgement unit 221 judges whether or not the area is a dangerous area based on the credit rank 2122 of the identified person.

The judgement unit 221 may judge that it is dangerous when at least one low credit person is present in the area. Further, the judgement unit 221 may judge whether or not there is a risk based on the number of low credit persons or the number of low credit persons per unit area. That is, the judgement unit 221 may perform the judgement based on the density of the low credit persons. In a manner similar to the first embodiment, the route determination unit 222 determines, as the transport route, the bypass route that bypasses the dangerous area when the candidate of the transport route passes through the dangerous area.

Figure 7:
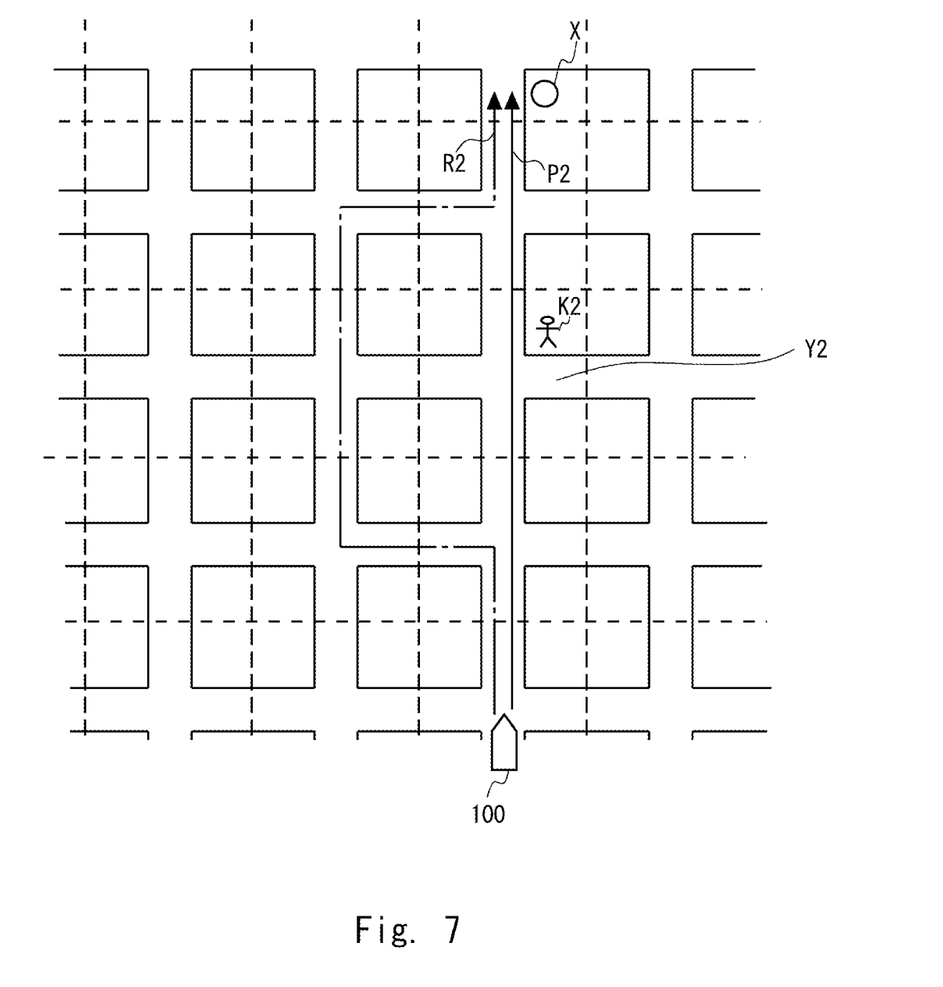
FIG. 7 is a schematic diagram showing an example of a transport route determined by the route determination system according to the second embodiment.

FIG. 7 is a schematic diagram showing an example of the transport route determined by the route determination system 300a. The delivery area is divided into squares as shown by dotted lines, and each of the squares corresponds to the area. The position of the autonomous mobile body 100 is set as the starting point. A delivery destination X shall be the destination point. It is assumed that there is a low credit person K2 in the area Y2. Further, it is assumed that there is no person whose credit rank 2122 is lower than a predetermined value in areas other than the area Y2. In such a case, the judgement unit 221 judges, for example, that the area Y2 is dangerous. Since a candidate P2 of the transport route passes through the area Y2, the route determination unit 222 determines a bypass route R2 that bypasses the area Y2 as the transport route.

The shortest route is the candidate P2 passing through the area Y2, but it is considered that the risk of theft by the low credit person K2 is high. Therefore, the route determination system 300a determines the bypass route R2, which has a lower risk of theft than that in the case of the shortest route, as the transport route.

Figure 8:
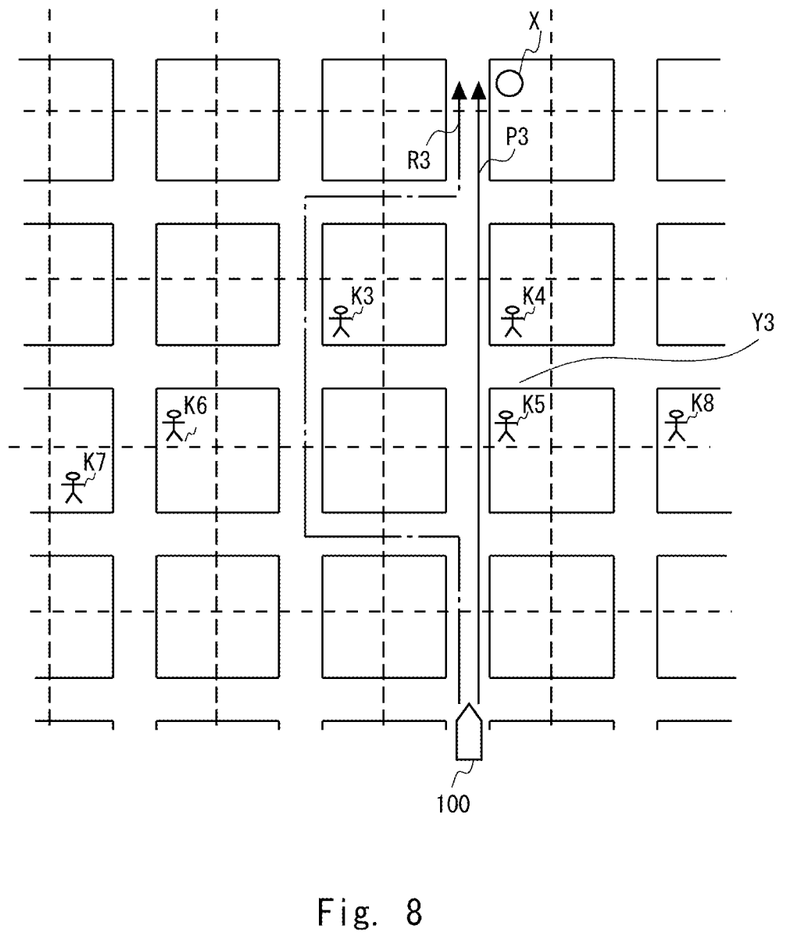
FIG. 8 is a schematic diagram showing an example of a transport route determined by the route determination system according to the second embodiment.

With reference to FIG. 8, a case will be described in which it is judged whether or not the area is dangerous based on the number of low credit persons. There are low credit persons K3 to K8 in the delivery area. In such a case, the judgement unit 221 judges, for example, that an area Y3 in which two or more low credit persons are present is dangerous. Here, the number of persons used as a threshold may be set so that an appropriate bypass route is determined. The route determination unit 222 determines a bypass route R3 as the transport route, because a candidate P3 of the transport route as the shortest route passes through the area Y3.

The bypass route R3 passes through the area where the low credit person K3 is present. However, this area is considered to have a lower risk of theft than that of the area Y3 where two low credit persons K4 and K5 are present. The route determination system 300 determines the bypass route R3 having a lower risk of theft than that of the shortest route as the transport route.

The route determination system 300a judges whether or not an area in a predetermined range is dangerous, and determines the transport route for bypassing the dangerous area. Thus, the route determination system 300a can determine the transport route to avoid areas where low credit persons are more concentrated, so that the risk of theft of articles is reduced.

Although the case in which the server 200a determines the transport route has been described above, the autonomous mobile body 100 may accept an input of the delivery destination and determine the transport route from the current position to the delivery destination. That is, the processing performed by the judgement unit 221 or the route determination unit 222 may be performed on the autonomous mobile body 100 side.

Although the above embodiments have been described as a hardware configuration, the present disclosure is not limited thereto. The present disclosure may be implemented by causing a CPU to execute a computer program for executing specified processing.

In the above example, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the embodiments described above, and may be appropriately modified without departing from the spirit thereof.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A route determination system for determining a transport route for an autonomous mobile body to transport an article on, the route determination system comprising a server and the autonomous mobile body,
    the server is configured to:
        judge whether or not an area including a position of a person is dangerous based on position information of the person and a credit rank of the person; and
        determine, as the transport route, a bypass route for bypassing a dangerous area when a candidate of the transport route passes through the dangerous area judged to be dangerous; and
    wherein the autonomous mobile body is configured to autonomously move along the transport route.

2. The route determination system according to claim 1, wherein
    the server is configured to judge whether or not an area in a predetermined range including the position of the person is dangerous based on the credit rank of the person.

3. The route determination system according to claim 1, wherein
    the server is configured to judge whether or not the area is dangerous based on the number of persons in the area of a predetermined range whose credit rank is a predetermined value or less.

4. The route determination system according to claim 1, wherein the server is further configured to:
    acquire information indicating whether or not the article is a valuable article, and
    determine the candidate as the transport route when the article is not the valuable article, and determine the bypass route as the transport route when the article is the valuable article.

5. The route determination system according to claim 1, wherein
    the server is configured to judge whether or not the area is dangerous based on the position information acquired from a terminal device possessed by the person.

6. A route determination method for determining a transport route for an autonomous mobile body to transport an article on, the route determination method comprising:
    judging whether or not an area including a position of a person is dangerous based on position information of the person and a credit rank of the person;
    determining, as the transport route, a bypass route for bypassing a dangerous area when a candidate of the transport route passes through the dangerous area judged to be dangerous in the determining of whether or not the area including the position of the person is dangerous; and
    controlling the autonomous mobile body to autonomously move along the transport route.

7. A non-transitory computer readable medium storing a route determination program for determining a transport route for an autonomous mobile body to transport an article on, the route determination program causing a computer to execute:
    judging whether or not an area including a position of a person is dangerous based on position information of the person and a credit rank of the person;
    determining, as the transport route, a bypass route for bypassing a dangerous area when a candidate of the transport route passes through the dangerous area judged to be dangerous in the determining of whether or not the area including the position of the person is dangerous; and controlling the autonomous mobile body to autonomously move along the transport route.

* * * * *